United States Patent
Iovanna et al.

(10) Patent No.: US 9,432,281 B2
(45) Date of Patent: Aug. 30, 2016

(54) APPARATUS AND METHOD FOR A COMMUNICATION NETWORK

(75) Inventors: Paola Iovanna, Rome (IT); Fabio Ubaldi, Perugia (IT); Cristiano Zema, Pisa (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 209 days.

(21) Appl. No.: 14/240,726

(22) PCT Filed: Sep. 6, 2011

(86) PCT No.: PCT/EP2011/065370
§ 371 (c)(1),
(2), (4) Date: May 21, 2014

(87) PCT Pub. No.: WO2013/026496
PCT Pub. Date: Feb. 28, 2013

(65) Prior Publication Data
US 2014/0307538 A1 Oct. 16, 2014

(30) Foreign Application Priority Data
Aug. 25, 2011 (EP) .................................. 11178753

(51) Int. Cl.
*H04L 12/26* (2006.01)
*H04L 12/703* (2013.01)
*H04L 12/715* (2013.01)
*H04L 12/707* (2013.01)
*H04L 12/723* (2013.01)

(52) U.S. Cl.
CPC ............... *H04L 45/28* (2013.01); *H04L 45/22* (2013.01); *H04L 45/64* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 7,652,983 B1 | 1/2010 | Li et al. | |
| 9,184,983 B2* | 11/2015 | Lee | H04L 41/04 |
| 2006/0256711 A1* | 11/2006 | Kusama | H04L 43/0811 370/216 |
| 2011/0229123 A1* | 9/2011 | Li | H04L 41/0668 398/5 |
| 2011/0280580 A1* | 11/2011 | Wexler | H04L 45/22 398/79 |
| 2012/0076046 A1* | 3/2012 | Lin | H04L 12/40013 370/254 |

(Continued)

OTHER PUBLICATIONS

International Search Report, Application No. PCT/EP2011/065370, Nov. 17, 2011, 3 pages.

(Continued)

*Primary Examiner* — Michael J Moore, Jr.
(74) *Attorney, Agent, or Firm* — Nicholson De Vos Webster & Elliott LLP (57) ABSTRACT

A node 800 of a multi-layer communication is capable of routing a message signal via one or more different layers (for example a PSC layer, TDM layer, LSC layer) in the multi-layer communication network. The node 800 comprises a first interface 801 for receiving a path message 803 containing routing information for routing an associated message signal through the multi-layer communication network. One or more second interfaces 805i to 805N are provided for transmitting a message signal to one or more respective layers in the multi-layer communication network. A processing unit 807 is adapted to determine if the path message 803 contains protection information 40 indicating that protection switching is to be performed in one or more different layers of the multi-layer communication network, and if so, establish a protection switching mechanism in the one or more different layers using the protection information 40 provided in the path message 803.

20 Claims, 6 Drawing Sheets

(56) References Cited

U.S. PATENT DOCUMENTS

2012/0163390 A1* 6/2012 Iovanna .......... H04L 45/00 370/400
2014/0078895 A1* 3/2014 Iovanna .......... H04L 45/22 370/228

OTHER PUBLICATIONS

Berger, L., et al., "GMPLS Segment Recovery", Network Working Group, RFC 4873, May 2007, 24 pages.
Huang, et al., "Extensions to RSVP-TE for MPLS Path Protection", IETF Draft Extensions to RSVP-TE for MPLS Path Protection, Jul. 2001, 12 pages.
Kompella, K., et al., "Label Switched Paths (LSP) Hierarchy with Generalized Multi-Protocol Label Switching (GMPLS) Traffic Engineering (TE)", Network Working Group, RFC 4206, Oct. 2005, 14 pages.
Lang, J.P., et al., "RSVP-TE Extensions in Support of End-to-End Generalized Multi-Protocol Label Switching (GMPLS) Recovery", Network Working Group, RFC 4872, May 2007, 47 pages.
Nishioka, Itaru, "Interoperability Demonstration of GMPLS-based Path Restoration", Sep. 6, 2004, 4 pages.
Nishioka, Itaru, et al., "Monolithic Control of Multi-layer Optical Networks: Path Control Mechanisms and Protection Experiments", IEEE, vol. 2, Sep. 8, 2002, 2 pages.
Roux, JL. L., et al., "Evaluation of Existing GMPLS Protocols against Multi-Layer and Multi-Region Networks (MLN/MRN)", Network Working Group, RFC 5339, Sep. 2008, 25 pages.
Shiomoto, K., et al., "Procedures for Dynamically Signaled Hierarchical Label Switched Paths", RFC 6107, Feb. 2011, 30 pages.
Shiomoto, K., et al., "Requirements for GMPLS-Based Multi-Region and Multi-Layer Networks (MRN/MLN)", Network Working Group, RFC 5212, Jul. 2008, 28 pages.
Awduche, D., et al., "RSVP-TE: Extensions to RSVP for LSP Tunnels", RFC 3209, Dec. 2001, 61 pages.
Berger, L., et al., "Generalized Multi-Protocol Label Switching (GMPLS) Signaling Functional Description", RFC 3471, Jan. 2003, 34 pages.
K., Kompella, et al., "Signalling Unnumbered Links in Resource ReSerVation Protocol—Traffic Engineering (RSVP-TE)", RFC 3477, Jan. 2003, 9 pages.
K., Kompella, et al., "OSPF Extensions in Support of Generalized Multi-Protocol Label Switching (GMPLS)", RFC 4203, Oct. 2005, 11 pages.
Papadimitriou, D., et al., "Generalized MPLS (GMPLS) Protocol Extensions for Multi-Layer and Multi-Region Networks (MLN/MRN)", RFC 6001, Oct. 2010, 24 pages.

* cited by examiner

APPARATUS AND METHOD FOR A COMMUNICATION NETWORK

CROSS-REFERENCE TO RELATED APPLICATIONS

This application is a National stage of International Application No. PCT/EP2011/065370, filed Sep. 6, 2011, which claims priority to EP Application No. 11178753.7, filed Aug. 25, 2011, which are hereby incorporated by reference.

TECHNICAL FIELD

The invention relates to an apparatus and method for a communication network, and in particular to an apparatus and method for a multi-layer communication network (also known as a multi-region network).

BACKGROUND

The present invention relates to an apparatus and method for communication networks that comprise multiple layers, for example wherein the different layers comprise different switching technologies or different switching granularity levels. These networks are commonly known as multi-layer networks (MLN) and multi-region networks (MRN). In such networks a Generalised Multi-Protocol Label Switching (GMPLS) technology, for example, can be provided to support the control of the network.

Most of the initial efforts to utilize GMPLS have been related to environments hosting devices with a single switching capability. The complexity raised by the control of such data planes is similar to that seen in classical IP/MPLS networks. By extending MPLS to support multiple switching technologies, GMPLS provides a comprehensive framework for the control of a multi-layered network of either a single switching technology or multiple switching technologies.

Internet Engineering Task Force (IETF) request for comments (RFC) 5212 defines the concept of multi-region and multi-layer networks, and describes the framework and requirements of GMPLS controlled multi-region and multi-layer networks. In GMPLS, a switching technology domain defines a region, and a network of multiple switching types is referred to in IETF RFC 5212 as a multi-region network (MRN). When referring in general to a layered network, which may consist of either single or multiple regions, IETF RFC 5212 uses the term multi-layer network (MLN).

The GMPLS extensions for multi-region networks and multi-layer networks, including routing aspects and signalling aspects, are described in IETF RFC 6001.

An "edge node" of a region, as described in RFC 5212, is defined as having multiple Interface Switching Capabilities (ISCs). As such, an edge node contains multiple matrices which may be connected to each other by internal links.

Nodes with multiple Interface Switching Capabilities are further classified as "simplex" or "hybrid" nodes by IETF RFC 5212 and IETF RFC 5339. A simplex node advertises several Traffic Engineering (TE) links, each with a single ISC value carried in a sub Time-Length-Value (sub-TLV) of its Interface Switching Capabilities Descriptor (ISCD). A hybrid node advertises a single TE link containing more than one ISCD, each with a different ISC value.

From a signalling point of view, a multi-layer path can be computed and set up basically according three main models:

According to a first model, known as "Pre-provisioning of Forwarding Adjacency Label Switched Paths (FA-LSPs)", the FA-LSP in a server layer is created before initiating the signalling of the client layer LSP.

According to a second model, known as "Signalling trigger server layer path computation", a source node of the client layer LSP (or the client layer Path Computation Element, PCE) only computes the route in its layer network. When the signalling of the client layer LSP reaches the region edge node, the edge node performs server layer FA-LSP path computation and then creates the FA-LSP.

According to a third model known as "Full path computation at source node (or Multi-Layer PCE)", the source node of the client layer LSP (or a PCE), having a multi-layer visibility, performs a full path computation including the client layer and the server layer routes. The server layer FA-LSP creation is triggered at the edge node by the client layer LSP signalling.

In this context, IETF RFCs 4206 and 6107 describe how to set up a hierarchy LSP (H-LSP) passing through multi-layer networks. The basic concept is to create the so called Forwarding Adjacencies (FAs), that is, to create so called Forwarding Adjacency LSPs (FA-LSP) in server layer networks and advertise them as TE links in client layer networks via GMPLS signalling and routing protocols.

In order to achieve these goals, a set of Time-Length-Value objects for Resource Reservation Protocols—Traffic Engineering (RSVP-TE TLV objects) are defined, that enable the exchange of TE Link information between the endpoints of the associated lower layer LSP, thus exploiting the FA-LSP concept. Examples are: the local TE link identifier, the Interior Gateway Protocol (IGP) identifier, and so on.

Figure 1:
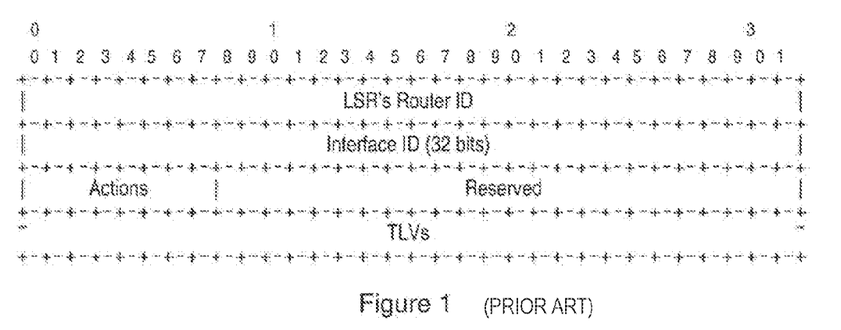
FIG. 1 shows a Label Switched Path (LSP) tunnel interface ID object according to Internet Engineering Task Force RFC 6107.

FIG. 1 shows a new C-Type variant of the LSP_TUNNEL_INTERFACE_ID object that has been defined in this context, to carry an unnumbered interface identifier and to indicate into which instance of the IGP the consequent TE link should be advertised (this last information is specified in specific IGP Instance Identifier TLV).

Figure 2:
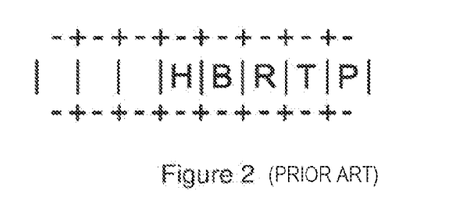
FIG. 2 shows further details of the Actions Field of the object of FIG. 1.

An important part of this new variant of the LSP_TUNNEL_INTERFACE_ID object, the basic form having been introduced in IETF RFC 3477, is the "Actions" field which is associated in the TLV describing the local TE link identifier, as shown in FIG. 2. The Actions Field consists of a set of flags that specify how the LSP that is being set up has to be treated.

The H-LSP extensions proposed in IETF 6107 are an efficient instrument to set up LSPs in heterogeneous technology networks, but only in simple cases (where there is no ambiguity to identify the layer where the FA-LSP is set and the layer in which the corresponding TE-link is advertised. However, such extensions are not suitable when crossing different layers, and lead to a lack of flexibility for the provision of certain features on a per layer basis.

In other words, there are cases in which it is not possible to provide a lower layer LSP with additional/modified features and/or modify the existing ones, because the required information is not signalled to the region boundary.

In fact, according to the policies of some operators, in a heterogeneous technology it is possible to create LSPs that require additional features when crossing a particular technology due to its specific issues, without impacting the other technologies/layers. This is not possible with the existing extensions described above.

SUMMARY

It is an aim of the present invention to provide a method and apparatus which obviate or reduce at least one or more of the disadvantages mentioned above.

According to a first aspect of the present invention there is provided a method in a node of a multi-layer communication network, wherein the node is capable of routing a message signal via one or more different layers in the multi-layer communication network. The method comprises the step of receiving a path message containing routing information for routing a message signal through the multi-layer communication network. The method determines if the path message contains protection information indicating that protection switching is to be performed in one or more different layers of the multi-layer communication network. If so, the method establishing a protection switching mechanism in the one or more different layers using the protection information provided in the path message.

According to another aspect of the present invention there is provided a method in a node of a multi-layer communication network, wherein a message signal is capable of being routing via one or more different layers in the multi-layer communication network. The method comprises the step of inserting routing information into a path message being processed by the node, wherein the path message is associated with a message signal being routed, and wherein the routing information defines a path for the message signal through the multi-layer communication network. The method also comprises the step of providing protection information in the path message, wherein the protection information indicates that protection switching is to be performed in one or more different layers of the multi-layer communication network.

According to another aspect of the present invention there is provided a node of a multi-layer communication network, wherein the node is capable of routing a message signal via one or more different layers in the multi-layer communication network. The node comprises a first interface for receiving a path message associated with a message signal being routed, the path message containing routing information for routing the message signal through the multi-layer communication network. The node also comprises one or more second interfaces for transmitting a message signal to one or more respective layers in the multi-layer communication network. The node comprises a processing unit adapted to determine if the path message contains protection information indicating that protection switching is to be performed in one or more different layers of the multi-layer communication network, and if so, establish a protection switching mechanism in the one or more different layers using the protection information provided in the path message.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The various embodiments will be described below in relation to multi-layer networks having layers such as packet switching capability (PSC layers), lambda switching capability (LSC layers) or time division multiplexing (TDM layers). It is noted, however, that the invention is applicable to any type of layer or region in a multi-layer or multi-region network, or any combination of layers or regions, and not limited to the examples provided in the preferred embodiments.

The embodiments of the present invention described below provide a signalling extension that allows a protection mechanism to be explicitly requested for a lower layer message path (for example a Label Switched Path, LSP) that is shown at an upper layer as a protected link, for example a protected Traffic Engineering (TE) link.

Furthermore, as will be described in greater detail below, a network comprising packet switching capability (PSC) nodes connected via lambda switching capability (LSC) nodes, for example, enables a protection mechanism to be requested for a LSC segment when a connection between two PSC nodes has to cross a region composed by LSC nodes, without introducing the protection mechanism at the PSC level.

The ability to provide a protection mechanism at a lower level and not at a higher level has advantages in many applications. For example, existing optical switching hardware takes a long time to switch traffic from one direction to another (up to 3-5 seconds), which affects the user service quality. In order to mitigate the traffic disruption impact in the optical layer, a common solution is to build a backup path in addition to the main path, where all the traffic is duplicated. When a failure is detected in the main path, the node switches automatically to the backup path. This operation is usually performed at a transport plane level using specific hardware techniques, making the switch operation very fast (less than 50 milliseconds). This solution (that is commonly called Optical Sub-Network Connection Protection, OSNCP) is represented in the control plane as a "1+1" protected LSP.

In such a scenario the embodiments of the present invention enable a protection mechanism to be established at the LSC layer, but not at a higher PSC layer where a protection mechanism may not be required or desired.

Figure 3:
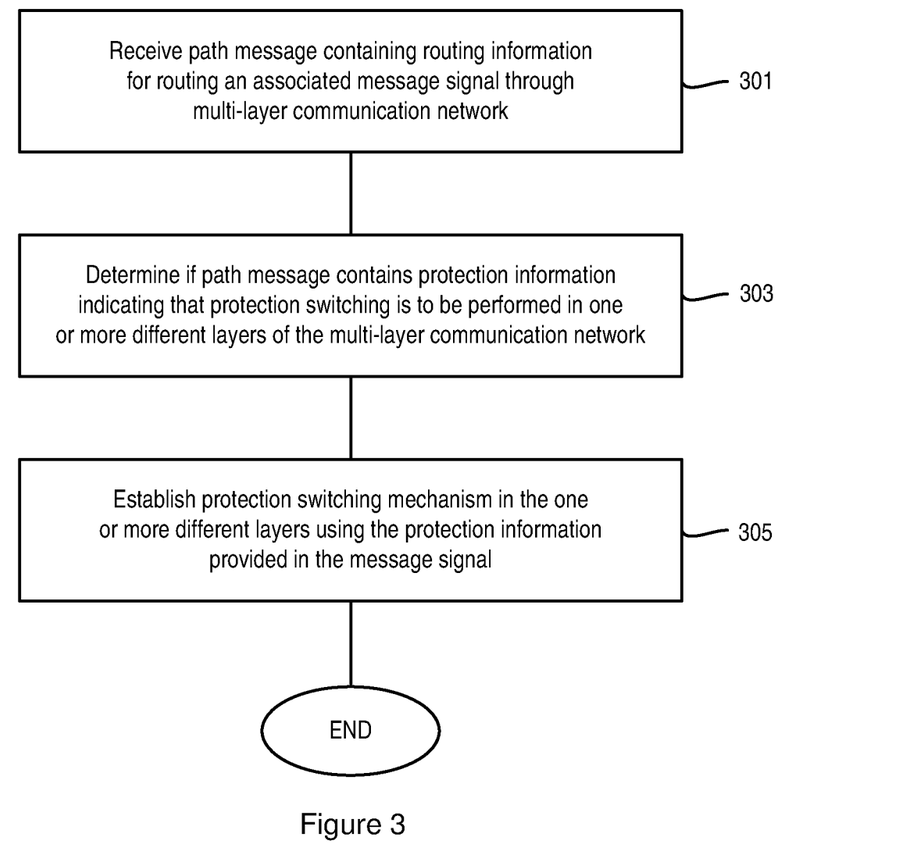
FIG. 3 shows the method steps performed by a node according to a first embodiment of the present invention

FIG. 3 shows a method performed at a node of a communication network, according to a first aspect of the present invention. In step 301 a node receives a path message containing routing information for routing an associated message signal through a multi-layer communication network.

In step 303, the node determines if the path message signal contains protection information indicating that protection switching is to be performed in one or more layers of the multi-layer communication network.

Using the protection information provided in the path message, the node then establishes a protection switching mechanism in the one or more different layers, step 305. The protection information may comprise one or more different portions of information that relate to different layers of a multi-layer network.

The protection information therefore acts as a control signal for protection switching, whereby the control signal is able to provide protection information in a specific layer or layers.

According to an embodiment of the invention, the protection information may be based on enhancements to existing standards defined in IETF RFCs, for example RFCs 3209, 4872 and 6107. The embodiments of the invention provide enhancements that enable the signalling of protection information in a multi-layer/multi-region context. The proposed mechanism has the advantage of allowing region boundary nodes to trigger lower layer Forwarding Adjacency Label Switched Paths (FA-LSPs), for example, according to given protection schemes. As a result, the whole hierarchical LSP structure can be protected on a per-layer basis according to the modes of hierarchy LSP provisioning.

Figure 4:
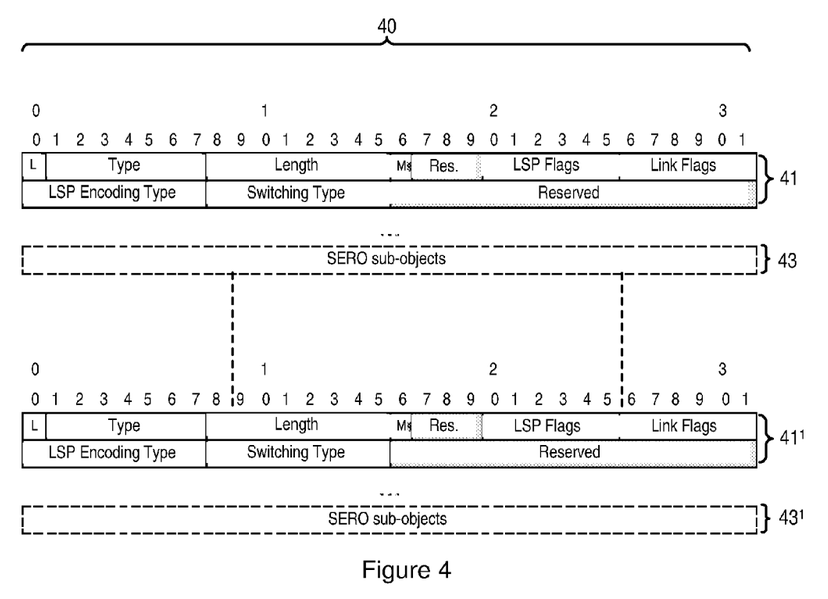
FIG. 4 shows protection information, for example a cross-layer protection (CLP) sub-object portion and a secondary explicit routing object (SERO) according to an embodiment of the present invention.

Referring to FIG. 4, further details will now be provided of an example of the protection information that can be user to provide the per-layer protection switching. The protection information 40 is shown as comprising a first portion 41 and a second portion 43, which act as control signals for protection switching.

According to one embodiment, in order to solve the problems described in the background section and to provide per-layer flexibility for the protection of a hierarchical LSP structure, the protection information may be provided by extending the RSVP-TE, for example by introducing a new sub-object for the Explicit Route Object (ERO), which will be referred to hereinafter as the CROSS-LAYER_PROTECTION (CLP) sub-object. The CLP sub-object, or first portion 41 shown in FIG. 4, allows protection information to be carried along a multi-layer path, in order to enable a lower layer protection mechanism to be triggered when this protection information is detected at a particular node. For example, a node may be configured to set up a FA-LSP with given protection attributes.

In the CLP sub-object shown in the embodiment of FIG. 4 the following fields are defined:

L bit—The L bit is an attribute of the sub-object. It is introduced for coherence with the ERO sub-object format (as described in IETF RFC 3209). It is set if the CLP sub-object applies to a loose hop in the explicit route. If the bit is not set, the CLP sub-object applies to a strict hop in the explicit route.

M (mandatory) bit—When set, it means the region edge node MUST set up the FA-LSP according to the protection information carried in the CLP; otherwise, the appointed protection information is suggested and the region edge node may provide protection features according to local policy.

LSP (Protection Type) Flags—This section, for example comprising 6 bits, indicates the desired end-to-end LSP recovery type for the FA-LSP (further details of which can be found in IETF RFC 4872).

Link Flags—This section, for example comprising 6 bits, indicates the desired link protection type for the links to be used by the FA-LSP (further details of which can be found in IETF RFC 3471).

LSP Encoding Type)—This section, for example comprising 8 bits, indicates the Encoding Type of the FALSP the CLP information relates to (further details of which can be found in IETF RFC 4203).

Switching Type—This section, for example comprising 8 bits, indicates the Switching Type of the FA-LSP the CLP information relates to (further details of which can be found in IETF RFC 4203).

It is noted that the various sections of the CROSS-LAYER_PROTECTION (CLP) sub-object may comprise a different number of bits to those shown in the example of FIG. 4.

According to one embodiment the CLP sub-object, i.e. protection information 41, is placed immediately behind a node or link (interface) address sub-object, indicating that the related node is a region edge node for the LSP in the ERO.

This way, such region edge node will be aware that it has to setup a FA-LSP according to the protection information carried in the CLP sub-object.

Optionally, Secondary Explicit Route Object (SERO) sub-objects (i.e. a second portion of protection information 43) can follow the CLP sub-object 41, indicating the ERO for backup LSPs if explicitly provided, for example, by a multi-layer path computation element, for example in Model 3 described above. The described mechanism can also be applied in the case of Model 2 described above (i.e. a signalling trigger server layer path computation model), but in such a case there would be no need to use SERO sub-objects, because the paths for both primary and backup LSPs would be computed by the region edge node.

Figure 5:
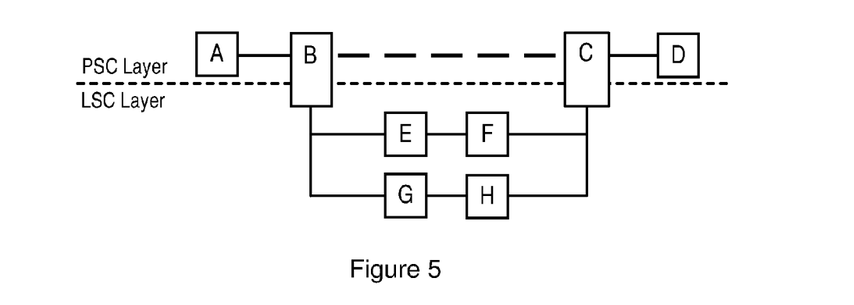
FIG. 5 shows an example of a first scenario, using embodiments of the invention described in FIGS. 3 and 4.

Referring to FIG. 5, there will now be provided a description of an example of an application of embodiments of the invention. FIG. 5 shows a multi-layer network comprising a first layer, for example a Packet Switching Capable (PSC) layer, and a second layer, for example a Lambda Switching Capable (LSC) layer. It is noted that the types of layer are examples only, and that the invention can be used in a multiplayer network comprising any type of layer. The PSC layer comprises a first PSC node, Node A, and a second PSC node, Node D. Two hybrid nodes, Node B and Node C, have both PSC and LSC capabilities, therefore belonging to both the PSC and LSC layers. The LSC layer comprises first, second, third and fourth LSC nodes (Node E, Node F, Node G, Node H). As an example, suppose that a multi-Layer path computation element (PCE) computes a path for PSC/LSP layers that has to be setup between Node A and Node D, passing through a Forwarding Adjacency LSP (shown as a dashed TE-Link in the PSC layer), which is in turn set up in the LSC layer between Node B and Node C. In addition, let us suppose that the FA-LSP in the LSC layer is requested to be protected with a 1+1 protection scheme with an explicit route also provided for the secondary LSP (i.e. a SERO is specified).

Based on the assumptions of such an example, protection information having a first portion, for example in the form of a CLP sub-object, is provided for indicating that Node B is a region edge node for the LSP, and that there are certain protection requirements for the FA-LSP between Node B (i.e. itself) and the other region edge node (for example Node C in the reference network of FIG. 5). According to one embodiment, the CLP sub-object (first portion of protection information) is placed immediately behind the node or link address sub-object related to node B in the multi-layer Explicit Routing Object (ERO).

When Node B receives a path message associated with a message signal being routed, (known as a PATH message), containing an ERO and determines that there is protection information in the form of a CLP sub-object in the message, for example immediately behind the node or link address sub-object related to itself, the Node B determines that it is a region edge node for the LSP, and that there are some protection requirements for the FA-LSP between itself and the other region edge node (Node C in the reference network scenario of FIG. 5).

Node B is adapted to obtain the protection information from the CLP sub-object, so that it can determine one or more of the following properties.

Using a first flag, for example the "L-bit" flag described above, Node B can determine if the indicated protection scheme relates to a FA-LSP having a loose or a strict ERO. For example the L-bit being set can indicate a loose ERO, and the L-bit not being set indicating a strict ERO, or vice versa.

Using a second flag, for example the M-bit flag described above, Node B can determine if the indicated protection scheme MUST or SHOULD be applied to the FA-LSP. For example, the M-bit being set can be used to indicate that the protection scheme MUST be applied, while the M-bit not being can be used to indicate that the protection scheme SHOULD be applied to the FA-LSP, or vice versa.

Using a third flag, for example the "LSP (Protection Type) Flags" described above (for example comprising 6 bits), the Node B can determine the end-to-end LSP recovery type to be applied to the FA-LSP (for example a 1+1 scheme in the example shown in FIG. 5).

Using a fourth flag, for example the "Link Flags" described above, the Node B can determine the link protection type for the links to be used by the FA-LSP.

Using fifth and sixth flags, for example the "LSP Encoding Type" flag and the "Switching Type" flags described above, Node B can determine the switching layer of the FA-LSP to which the protection scheme applies (LSC layer in the example of FIG. 5).

After obtaining the first portion of the protection information for the FA-LSP, Node B determines that the CLP sub-object is followed by a second portion of protection information, the SERO sub-object, indicating the ERO for the backup FA-LSP.

At this point Node B has all of the protection information it requires for setting up the FA-LSP, and triggers the setup of the following paths.

A primary LSC FA-LSP (for example passing through nodes B-E-F-C in the example of FIG. 5) is setup according to the first portion of protection information, being the CLP sub-object in the ERO.

A secondary LSC FA-LSP for 1+1 protection (for example passing through nodes B-G-H-C in the example of FIG. 5) is setup according to the second portion of the protection information, being the SERO sub-object following the CLP.

It will be appreciated from the above that the proposed method applies on a per-layer basis, adding layer flexibility to the protection schemes to be adopted for FAs.

Figure 6:
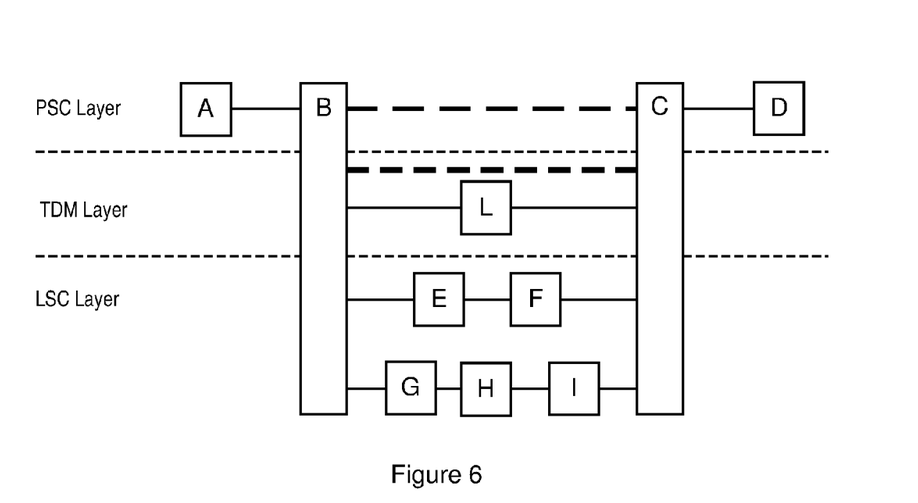
FIG. 6 shows an example of a second scenario, using embodiments of the invention described in FIGS. 3 and 4.

FIG. 6 shows another example of the applicability of the CLP sub-object information. FIG. 6 shows a multi-layer network comprising a first layer, for example a Packet Switching Capable (PSC) layer, a second layer, for example a TDM layer, and a third layer, for example a Lambda Switching Capable (LSC) layer. It is noted that the types of layer are examples only, and that the invention can be used in a multi-layer network comprising any type of layer, or any number of different layers.

The PSC layer comprises a first PSC node, Node A, and a second PSC node, Node D. The PSC layer also comprises first and second hybrid nodes, Node B and Node C, having capabilities in PSC, TDM and LSC technologies.

The TDM layer comprises a first node, Node L (in addition to hybrid Nodes B and C that have a capability in the TDM layer).

The LSC layer comprises first, second, third, fourth and fifth LSC nodes, Node E, Node F, Node G, Node H, Node I, in addition to hybrid Nodes B and C that have a capability in the TDM and PSC layers.

Suppose, for example, that a PSC LSP that has to be setup between nodes A and D, passing through a FA-LSP (shown as a dashed TE-Link in the PSC layer) set up in the TDM layer between nodes B and C, which is itself a FA-LSP (shown as a dashed TE-Link in TDM layer) set up in the LSC layer. In addition, if it is supposed that the FA-LSP in the TDM layer is requested to be optionally protected with a 1:1 protection scheme, while the FA-LSP in the LSC layer is requested to be mandatory protected with a 1+1 protection scheme with an explicit route also for the secondary LSP (i.e. a SERO is specified).

With such assumptions, according to an embodiment of the invention there will be first and second CLP sub-objects as described below (corresponding to the first portions 41 and 41' of FIG. 4). The first CLP sub-object will carry the following protection information:
a TDM FA-LSP has to be set up (derived from the Switching Type and Encoding Type fields);
the TDM FA-LSP has a loose ERO (L bit set);
the related protection scheme is optional (M bit not set);
the related protection scheme is 1:1 (LSP Flags field);
the TDM FA-LSP should use links with the protection parameters suggested in the CLP sub-object (derived from the Link Flags field).

The second CLP sub-object will carry the following protection information:
a LSC FA-LSP has to be set up (derived from the Switching Type and Encoding Type fields);
the LSC FA-LSP has a strict ERO (L bit not set);
the related protection scheme is mandatory (M bit set);
the related protection scheme is 1+1 (LSP Flags field);
the LSC FA-LSP should use links with the protection parameters suggested in the CLP sub-object (derived from the Link Flags field).

A set of SERO sub-objects, for example placed just behind the second CLP sub-object, will indicate the strict ERO for the secondary LSC FA-LSP used for 1+1 protection (for example B-G-H-I-C in the example shown in FIG. 6).

After obtaining the protection information from the CLP sub-objects and SERO sub-objects, node B will trigger the setup of the following paths.

A primary LSC FA-LSP (for example passing through nodes B-E-F-C in the example of FIG. 6) is set up according to the CLP sub-objects in the ERO.

A secondary LSC FA-LSP for 1+1 protection (for example passing through nodes B-G-H-I-C in the example of FIG. 6) is set up according to the SERO sub-objects following the second CLP.

A primary TDM FA-LSP, with a path computed according to the loose ERO "B-C" (for example the single hop TDM FA-LSP, passing through the TE Link resulting from the LSC FA-LSP).

A secondary TDM FA-LSP for 1:1 protection with a path computed according to the loose ERO "B-C" (for example passing through nodes B-L-C in the example of FIG. 6).

As a result, there will be a hierarchy of LSPs with specific protection mechanism for each layer. This is desirable, for example for technology specific issues, especially when dealing with LSPs spanning both optical and packet regions.

Figure 7:
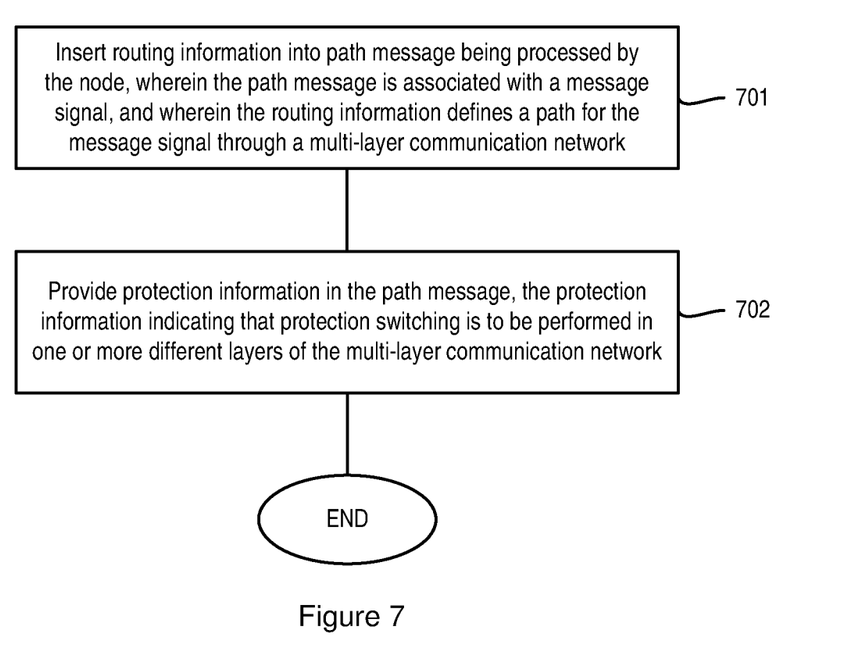
FIG. 7 shows the method steps performed by another node, according to an embodiment of the invention.

FIG. 7 describes the steps that may be performed in another node of the network, for example a node that is adapted to add the protection information to a path message associated with a message signal.

In step 701 routing information is inserted into a path message being processed by the node. The path message is associated with a message signal that is to be routed through the network, wherein the routing information defines a path for the message signal through the multi-layer communication network. In step 702, protection information is provided in the path message, the protection information indicating that protection switching is to be performed in one or more different layers of the multi-layer communication network.

The protection information may comprise one or more portions, each portion indicating a protection switching mechanism that is to be applied in a corresponding layer. This enables protection switching to be provided on a per-layer basis.

The protection information may be added by a node that is also adapted to determine the routing information, for example a path computation element. Alternatively, the protection information may be added by a node which acts on routing information already computed by another upstream node. When provided in a path computation element (PCE), the PCE may be adapted to compute a path for a packet through a multi-layer network, whereby the PCE is further adapted to add cross-layer protection switching information to the signalling information, for enabling a node in the network to perform protection switching for one or more lower order nodes.

Figure 8:
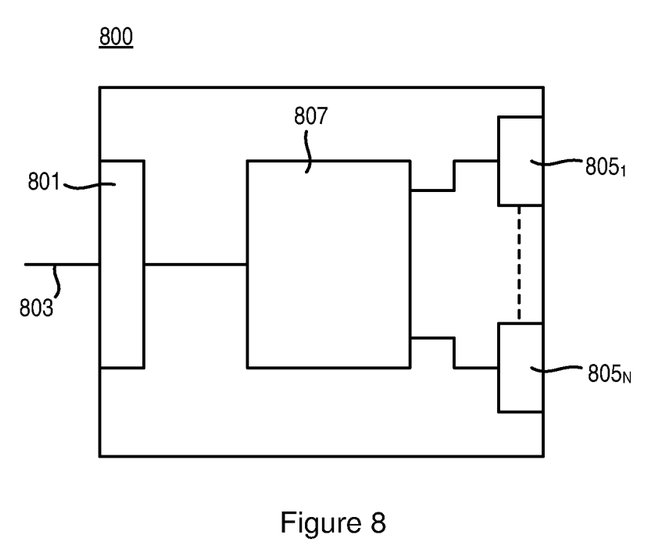
FIG. 8 shows a node according to an embodiment of the invention.

FIG. 8 shows a node 800 of a multi-layer communication network according to an embodiment of the invention. The node 800 is capable of routing a message signal via one or more different layers (for example a PSC layer, TDM layer, LSC layer) in the multi-layer communication network. The node comprises a first interface 801 for receiving a path message 803 associated with a message signal being routed, the path message containing routing information for routing the message signal through the multi-layer communication network. One or more second interfaces $805_1$ to $805_N$ are provided for transmitting a message signal to one or more respective layers in the multi-layer communication network. A processing unit 807 is adapted to determine if the path message 803 contains protection information 40 indicating that protection switching is to be performed in one or more different layers of the multi-layer communication network, and if so, establish a protection switching mechanism in the one or more different layers using the protection information 40 provided in the path message 803.

The embodiments of the invention have numerous advantages, some of which are outlined as follows.

The embodiments allow the explicit signalling of cross-layer protection information in MLN/MRN contexts, thus avoiding wrong or unpredictable network configuration due to the application of local policies (which are often not standardized).

The invention also provides protection features on a per layer fashion, which significantly improve the flexibility in managing complex and heterogeneous networks.

The embodiments of the invention also act to improve the stability of the network, because it will be possible to provide protection for LSP in such regions/layers of the network, where a fault would be more damaging. Moreover, as an example, the 1+1 protection scheme can be applied only for technologies where a restoration would be too time consuming (for example in optical regions) while the 1:1 protection scheme with extra traffic can be avoided for a region where there is the possibility to restore traffic in a faster way.

Thus, the embodiments of the invention also have the advantage of improving the optimization of the utilization of network resources, because it is possible to trigger protected LSPs only when and where needed. For example, a 1+1 protection scheme applied without a per-layer selection means as provided by embodiments of the present invention would provide two disjoint LSPs for each layer, whereas with the embodiments of the invention the real need for reserve duplicate resources can be limited to only one layer.

The embodiments of the invention also allow high-valued protection features to be provided only to high-valued portions of the network, such that billing differentiation can then be provided on this basis. For example, providing a 1+1 protection scheme to an end-to-end LSP spanning several regions would have a cost advantage due to the need to setup of a lower number of LSPs, i.e. only for those layers that require a protection mechanism, rather than two LSPs for each layer.

The provisioning of enhanced features in current network nodes are also provided at low cost. The embodiments of the invention can be easily implemented because it implies a minimal extension to the current standards and it is also fully backward compatible with them.

The embodiments of the present invention described above provide a signalling extension, for example on the basis of a H-LSP approach, but which allows to explicit the request of a protection mechanism for a lower layer LSP that is shown at upper layer as a protected TE link.

It is noted that a multi-layer network (MLN) relates to a Traffic Engineering (TE) domain comprising multiple data plane switching layers either of the same ISC (e.g., TDM) or different ISC (e.g., TDM and PSC) and controlled by a single GMPLS control plane instance. A particular case of MLNs is defined. A multi-region network (MRN) is defined as a TE domain supporting at least two different switching types (e.g., PSC and TDM), either hosted on the same device or on different ones, and under the control of a single GMPLS control plane instance.

The methods of the invention described in the embodiments of the multi-layer networks described above enable protection information to be carried along a multi-layer path, wherein the protection information is used to trigger lower layer FA-LSP setup with predetermined protection attributes.

Although embodiments of the invention describe the CLP sub-object being placed immediately behind the node or link address sub-object related to a node in the multi-layer Explicit Routing Object (ERO), it is noted that the CLP sub-object can be placed in other regions, without departing from the scope of the invention.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a node of a multi-layer communication network, wherein the node is capable of routing a message signal via one or more different layers in the multi-layer communication network, the method comprising the steps of:
- receiving a path message containing routing information for routing a message signal through the multi-layer communication network;
- determining if the path message contains protection information indicating that protection switching is to be performed in one or more different layers of the multi-layer communication network, wherein the protection information is to indicate which layer a protection switching mechanism applies; and
- if so, establishing the protection switching mechanism at the node in the one or more indicated layers using the protection information provided in the path message.

2. The method as claimed in claim 1, wherein the protection information comprises a first portion for indicating the protection switching mechanism to be provided in a first path of a first layer, and wherein the step of establishing the protection switching mechanism comprising establishing protection switching in the first layer based on the protection information provided in the first portion.

3. The method as claimed in claim 2, wherein the protection information comprises a second portion for indicating the protection switching mechanism to be provided in a second path of the first layer, the method further comprising the step of establishing protection switching in the second path of the first layer based on the protection information provided in the second portion.

4. The method as claimed in claim 3, wherein the protection switching mechanism provided in the second path of the first layer according to the second portion of the protection information comprises a back-up protection path.

5. The method as claimed in claim 4, wherein the protection information comprises a third portion for indicating the protection switching mechanism to be provided in a first path of a second layer, the method further comprising the step of establishing protection switching in the second layer based on the protection information provided in the third portion.

6. The method as claimed in claim 5, wherein the protection information comprises a fourth portion for indicating the protection switching mechanism to be provided in a second path of the second layer, the method further comprising the step of establishing protection switching in the second path of the second layer based on the protection information provided in the second portion.

7. The method as claimed in claim 1, wherein the routing information comprises an explicit routing object.

8. The method as claimed in claim 5, wherein the routing information comprises an explicit routing object, and wherein the first portion or third portion of the protection information is carried in a respective sub-object of the explicit routing object, the respective sub-object providing cross-layer protection information for the first and second layers, respectively.

9. The method as claimed in claim 6, wherein the routing information comprises an explicit routing object, and wherein the second portion or fourth portion of the protection information is provided in a secondary explicit routing object (SERO) sub-object for a first layer and a second layer, respectively.

10. The method as claimed in claim 2, wherein the first portion of the protection information is provided immediately after a node address in the message signal.

11. A method in a node of a multi-layer communication network, wherein a message signal is capable of being routed via one or more different layers in the multi-layer communication network, the method comprising the steps of:
- inserting routing information into a path message being processed by the node, wherein the path message is associated with a message signal being routed, and wherein the routing information defines a path for the message signal through the multi-layer communication network; and
- providing protection information in the path message, wherein the protection information indicates that protection switching is to be performed in one or more different layers of the multi-layer communication network, wherein the protection information is to indicate which layer a protection switching mechanism applies, and wherein the protection information enables another node to perform protection switching at the indicated one or more layers using the protection information.

12. The method as claimed in claim 11, wherein the step of providing protection information comprises the step of providing a first portion for indicating the protection switching mechanism to be provided in a first path of a first layer.

13. The method as claimed in claim 12, wherein the step of providing protection information further comprises the step of providing a second portion for indicating the protection switching mechanism to be provided in a second path of the first layer.

14. The method as claimed in claim 11, wherein the step of providing protection information further comprises the step of providing at least one further portion for indicating the protection switching mechanism to be provided in at least one other layer of the multi-layer communication network.

15. A node of a multi-layer communication network, wherein the node is capable of routing a message signal via one or more different layers in the multi-layer communication network, the node comprising:
- a first interface for receiving a path message associated with a message signal being routed, the path message containing routing information for routing the message signal through the multi-layer communication network;
- one or more second interfaces for transmitting a message signal to one or more respective layers in the multi-layer communication network; and
- a processing unit adapted to determine if the path message contains protection information indicating that protection switching is to be performed in one or more different layers of the multi-layer communication network, wherein the protection information is to indicate which layer a protection switching mechanism applies, and if so, establish the protection switching mechanism at the node in the one or more indicated layers using the protection information provided in the path message.

16. The node as claimed in claim 15, wherein the processing unit is adapted to determine whether the protection information comprises a first portion for indicating the protection switching mechanism to be provided in a first layer, and if so, establish a protection switching mechanism in the first layer based on the protection information provided in the first portion.

17. The node as claimed in claim 16, wherein the processing unit is further adapted to determine whether the protection information comprises a second portion for indicating the protection switching mechanism to be provided in the first layer, and if so, establish a protection switching mechanism in the first layer based on the protection information provided in the second portion.

18. The node as claimed in claim 16, wherein the processing unit is further adapted to determine whether the protection information comprises at least one further portion for indicating the protection switching mechanism to be provided in at least one other layer of the multi-layer communication network, and if so establish a protection switching mechanism in the at least one or more other layers according to the respective portions of the protection information.

19. The node as claimed in claim 15, wherein the routing information comprises an explicit routing object.

20. The node as claimed in claim 18, wherein the routing information comprises an explicit routing object, and wherein the portions of the protection information is carried in a respective sub-object of the explicit routing object, the respective sub-object providing cross-layer protection information for the first and one other layers, respectively.

* * * * *